United States Patent
Izumi

[11] Patent Number: 5,305,348
[45] Date of Patent: Apr. 19, 1994

[54] SPREAD-SPECTRUM COMMUNICATION APPARATUS

[75] Inventor: Michihiro Izumi, Kawasaki, Japan

[73] Assignee: Canon Kabushiki Kaisha, Tokyo, Japan

[21] Appl. No.: 978,627

[22] Filed: Nov. 19, 1992

[30] Foreign Application Priority Data

Nov. 19, 1991 [JP] Japan ................................ 3-303269

[51] Int. Cl.$^5$ ............................................. H04L 9/00
[52] U.S. Cl. ......................................... 375/1; 380/46; 380/34
[58] Field of Search ........................ 375/1; 380/46, 34

[56] References Cited

U.S. PATENT DOCUMENTS

| | | | |
|---|---|---|---|
| 3,947,674 | 3/1976 | Gutleber | 375/1 |
| 4,872,200 | 10/1989 | Jansen | 375/1 |
| 4,958,359 | 9/1990 | Kato | 375/380 |
| 5,068,872 | 11/1991 | Schroter | 375/1 |
| 5,128,998 | 7/1992 | Kurihara | 375/1 |
| 5,157,689 | 10/1992 | Kurihara | 375/1 |
| 5,202,694 | 4/1993 | Farmer et al. | 375/1 |

Primary Examiner—David C. Cain
Attorney, Agent, or Firm—Morgan & Finnegan

[57] ABSTRACT

A spread-spectrum communication apparatus has code generators for generating spread-spectrum and reverse spread-spectrum codes. Rather than using a code generator which differs for every apparatus, the code generators have an identical construction for every apparatus. Specifically, each apparatus is provided with a programmable ROM storing a value specific to each apparatus. When power is introduced to the apparatus, the value specific to the apparatus is read out of the programmable ROM first. Each apparatus generates a code, which is specific to the apparatus, used in spreading and reverse-spreading in dependence upon the specific value that has been read out of the ROM.

17 Claims, 11 Drawing Sheets

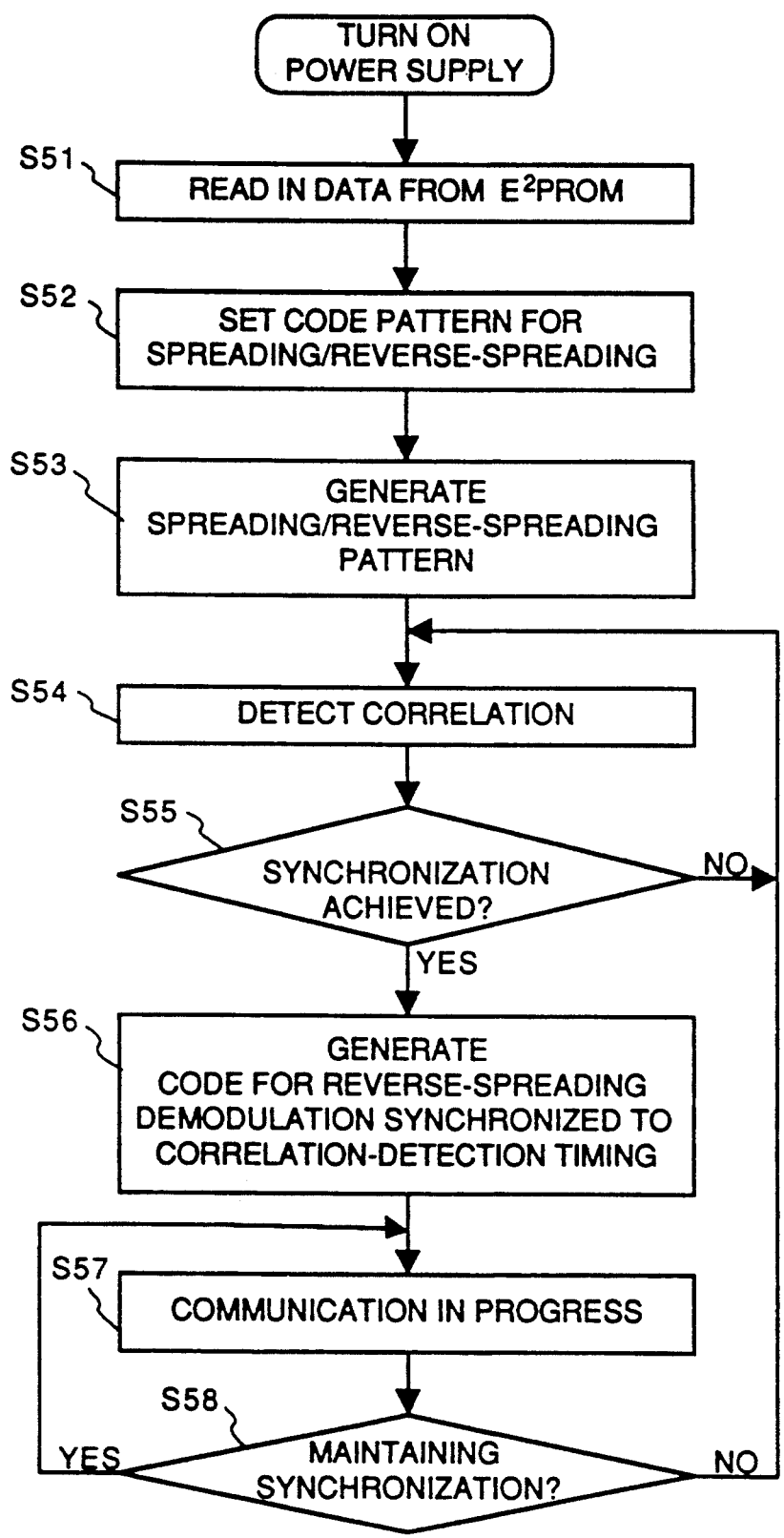
F I G. 11

SPREAD-SPECTRUM COMMUNICATION APPARATUS

BACKGROUND OF THE INVENTION

1. Field of the Invention

This invention relates to a spread-spectrum communication apparatus.

2. Description of the Prior Art

In a spread-spectrum communication system known in the art, a baseband information signal to be transmitted is converted into a baseband signal having a large bandwidth by a pseudonoise code which possesses a spectrum width sufficiently larger than that of the information signal, the baseband signal is modulated by a modulating method such as PSK (phase-shift keying) or FSK (frequency-shift keying) to form a high-frequency signal, and the high-frequency signal is transmitted. In order that mixing of signals will not occur in this system, it is required that a third communicating party using the same pseudonoise code not exist.

In a case where such a spread-spectrum communication technique is applied to a communication system which accommodates a plurality of terminals, a different spread-spectrum code is allocated for each terminal in order to prevent interference between terminals connected to an extension.

However, since a different code generator is provided for each apparatus, the following drawbacks arise:

1) Since code generators cannot be shared, the code generators result in high cost. This raises the cost of the apparatus.

2) It is very difficult to manage code generators of a large number of types.

Furthermore, in order to maintain synchronism between the transmitting and receiving sides, a synchronizing circuit which includes a correlation detector for each code pattern is required. Consequently, there are different components for each terminal. This leads to an increase in terminal cost and to difficulties in production.

In addition, when a sliding correlator is used in order to readily detect correlation with a received signal, an extended period of time is necessary to achieve synchronization.

Further, when a convolver or the like is used in order to achieve synchronization, the convolver differs for each code pattern. The result is a rise in cost and difficulties in production.

SUMMARY OF THE INVENTION

An object of the present invention is to make it possible to use a single code generator in a plurality of apparatus by providing a spread-spectrum communication apparatus with means for reading the content of a memory and means for controlling a code generating unit in dependence upon the read content of the memory.

Another object of the present invention is to provide a spread-spectrum communication apparatus comprising non-volatile memory means for storing a value specific to each apparatus, reading means for reading the specific value out of the memory means, code generating means for generating a code conforming to set data, setting means for setting the specific value in the code generating means, and spreading means for spreading input data using the code generated by the code generating means.

Another object of the present invention is to provide a spread-spectrum communication apparatus comprising receiving means for receiving a signal, nonvolatile memory means for storing a value specific to each apparatus, reading means for reading the specific value out of the memory means, code generating means for generating a code conforming to set data, setting means for setting the specific value in the code generating means, and reverse spreading means for reverse-spreading a signal, which has been received by the receiving means, using the code generated by the code generating means.

Still another object of the present invention is to provide a spread-spectrum communication apparatus comprising generating means for generating codes of a plurality of types, selecting means for selecting a specific code from among the plurality of codes generated by the generating means, and spreading means for spreading a communication signal in dependence upon the specific code selected by the selecting means.

A further object of the present invention is to provide a spread-spectrum communication apparatus capable of communicating with a plurality of terminals, comprising first generating means for generating codes common to each of the terminals, second generating means for generating a desired code, in accordance with input data, from among the plurality of codes corresponding to the terminals, means for spreading and modulating data, which is transmitted to the plurality of terminals, by a first code, means for spreading and modulating the data, which has been spread and modulated by the first code, by a second code, and means for inputting data, which corresponds to a terminal of a communicating party, to the second generating means.

A further object of the present invention is to provide a spread-spectrum communication apparatus capable of communicating with a plurality of terminals, comprising receiving means for receiving a signal, generating means for generating a desired code, in accordance with input data, from among a plurality of codes corresponding to the terminals, means for reverse spreading and demodulating the signal, which has been received by the receiving means, by the code generated by the generating means, and means for inputting data, which corresponds to a terminal of a communicating party, to the generating means.

Yet another object of the present invention is to provide a spread-spectrum communication apparatus capable of communicating with a plurality of terminals, comprising first generating means for generating codes common to each of the terminals, second generating means for generating a desired code, in accordance with input data, from among the plurality of codes corresponding to the terminals, means for spreading and modulating data, which is transmitted to the plurality of terminals, by a first code, means for spreading and modulating the data, which has been spread and modulated by the first code, by a second code, means for inputting data, which corresponds to a terminal of a communicating party, to the second generating means, receiving means for receiving a signal, third generating means for generating a desired code, in accordance with the input data, from among the plurality of codes corresponding to the terminals, means for reverse-spreading and demodulating the signal, which has been received by the receiving means, by the third code, and means for inputting data, which corresponds to a terminal of a communicating party, to the third generating means.

Still another object of the present invention is to provide a spread-spectrum communication apparatus comprising first generating means for generating a desired code in accordance with input data, means for spreading and modulating transmission data by the code generated by the first generating means, second generating means for generating a fixed code, third generating means for generating a desired code in accordance with the input data, receiving means for receiving a signal, synchronizing means for synchronizing the code generated by the second generating means and the signal received by the receiving means, reverse-spreading means for reverse-spreading the received signal by the code generated by the second generating means, and means for reverse-spreading an output from the reverse-spreading means by the code generated by said third generating means.

Yet another object of the present invention is to provide a spread-spectrum communication apparatus capable of communicating with a plurality of terminals, comprising a terminal interface unit which includes: first generating means for generating codes common to each of the terminals, second generating means for generating a desired code, in accordance with input data, from among the plurality of codes corresponding to the terminals, means for spreading and modulating data, which is transmitted to the plurality of terminals, by a first code, means for spreading and modulating the data, which has been spread and modulated by the first code, by a second code, means for inputting data, which corresponds to a terminal of a communicating party, to the second generating means, receiving means for receiving a signal, third generating means for generating a desired code, in accordance with the input data, from among the plurality of codes corresponding to the terminals, means for reverse-spreading and demodulating the signal, which has been received by the receiving means, by the third code, and means for inputting data, which corresponds to the terminal of the communicating party, to third generation means; and a terminal unit which includes: fourth generating means for generating a code identical with that of the third generating means in accordance with the input data, means for spreading and modulating transmission data by the code generated by the fourth generating means, fifth generating means for generating a code identical with that of the first generating means, sixth generating means for generating a code identical with that of the second generating means in accordance with the input data, receiving means for receiving a signal, synchronizing means for synchronizing the code generated by the fifth generating means and the signal received by the receiving means, reverse-spreading means for reverse-spreading the received signal by the code generated by the fifth generating means, and means for reverse-spreading an output from the reverse-spreading means by the code generated by the sixth generating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a processing flowchart of the extension terminal in the exchange of the fourth embodiment.

DESCRIPTION OF THE PREFERRED EMBODIMENTS

First Embodiment

Figure 1:
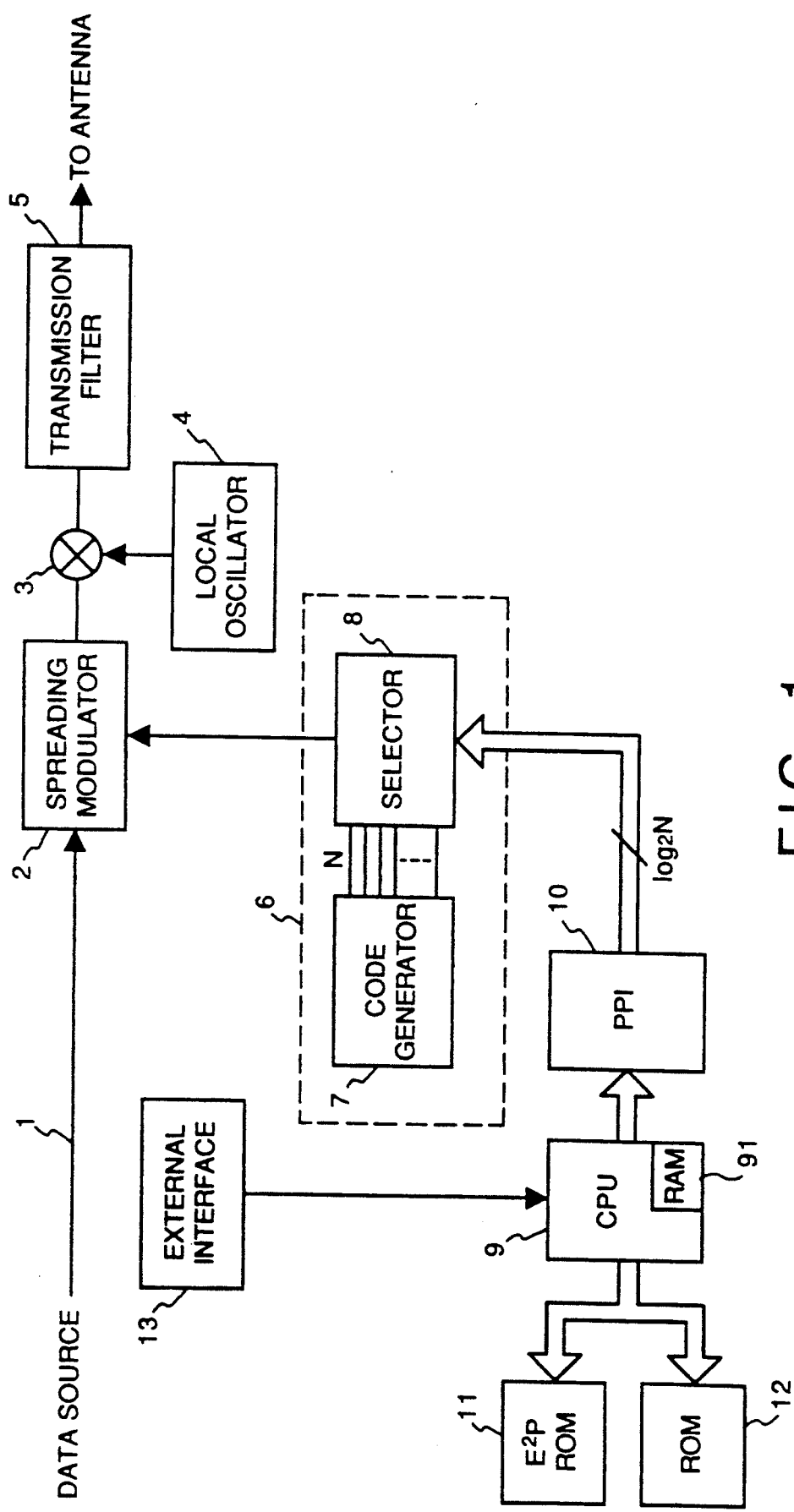
FIG. 1 is a block diagram showing a spread-spectrum communication apparatus according to a first embodiment of the present invention.

FIG. 1 is a block diagram showing a first spread-spectrum communication apparatus for practicing the present invention. When data is inputted from a data source 1, the inputted data is spread by a spreading modulator 2 and is applied to a mixer 3 to modulate a carrier wave generated by a local oscillator 4. The modulated carrier wave is limited to a transmission band by a transmission filter 5 and then is transmitted from an antenna.

A CPU 9 control the apparatus by executing a program stored in a ROM 12. The spreading of the signal is carried out using a code generating unit 6, which includes a code generator 7 and a selector 8, and a PPI (programmable peripheral interface) 10. Prescribed data has been stored in an E²PROM (electrically erasable programmable ROM) 11. A communication processing command is provided through an external interface 13.

Figure 2:
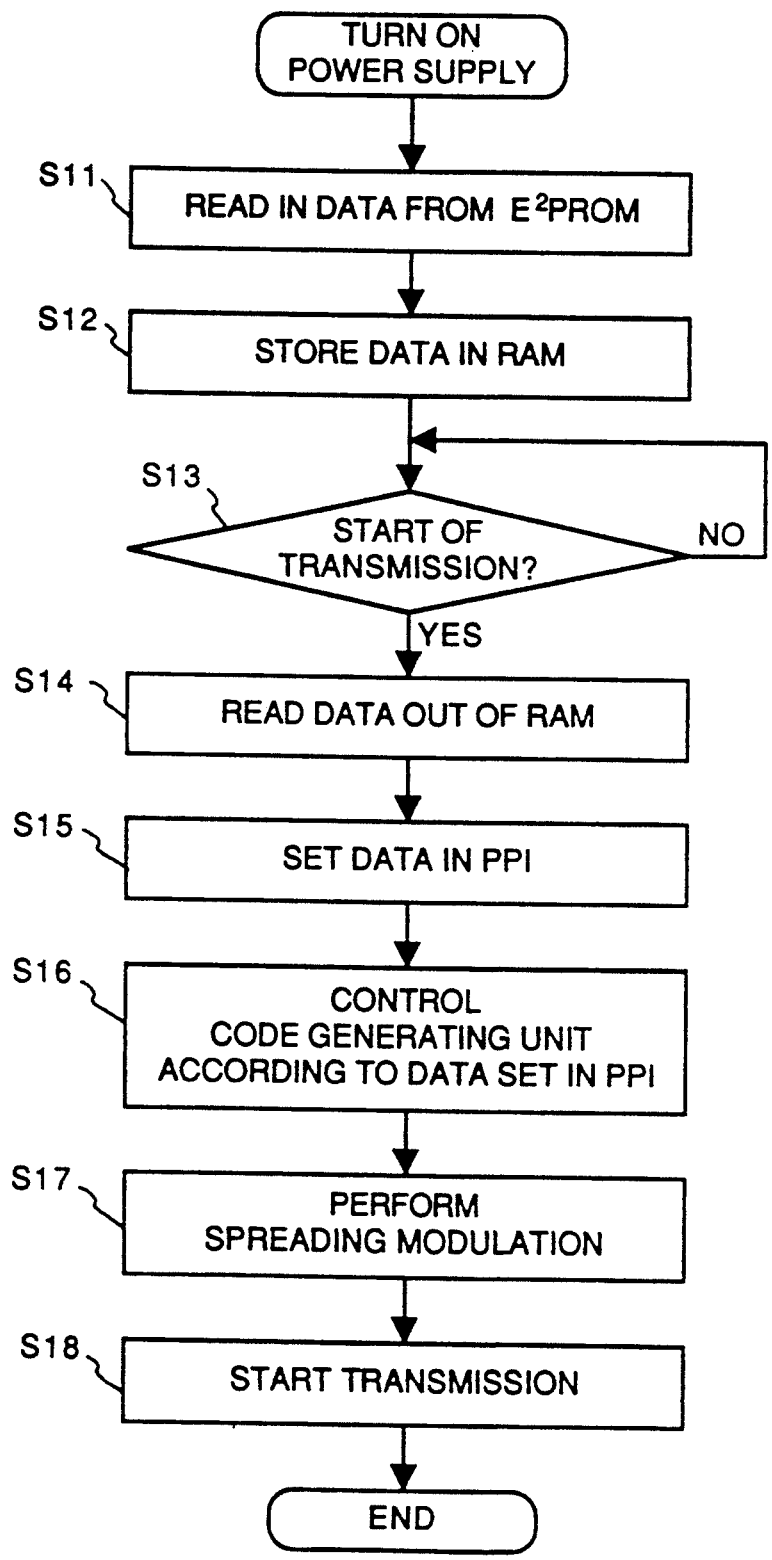
FIG. 2 is a flowchart of the operation performed by the spread-spectrum communication apparatus of the first embodiment.

FIG. 2 is a flowchart showing the procedure of processing executed by the spread-spectrum communication apparatus according to this embodiment. Operation will be described with reference to FIGS. 1 and 2.

When power is introduced to the apparatus, the CPU 9 starts operation in accordance with a program that has been written in the ROM 12. First, at step S11, the E²PROM 11 is accessed. Data such as a number specific to each apparatus is written in the E²PROM 11 in advance. Next, at step S12, the CPU 9 writes the number specific to the apparatus, which number has been read in from the E²PROM 11, in an internal RAM 91. The RAM 91 may by one connected externally of the CPU 9.

When a communication-start request is received via the external interface 13, a signal indicative of this request enters the CPU 9. The CPU 9 examines this signal at step S13. If the request for starting communication is verified, then the program proceeds to step S14, at which the data specific to each apparatus stored in the RAM is read out. This data is written in the PPI 10 at step S15. The PPI 10 is connected to the code generating unit 6 and is capable of controlling the code generating unit 6 by the output data.

As mentioned above, the code generating unit 6 includes the code generator 7, which generates pseudo-noise codes, and the selector 8. The code generator 7 generates codes having N types of patterns. The N types of codes enter the selector 8. At step S16, the PPI 10 controls the selector 8 by the data written in at step S15, whereby the selector 8 selects a pattern necessary for modulation from among the N types of code patterns. For example, if just one type of pattern is required from the N types, the number of control lines necessary for controlling the selector 8 will be $\log_2 N$.

The code selected is inputted to the spreading modulator 2. At step S17, the modulator 2 adds the data inputted from the data source 1 and the spread-spectrum code inputted from the selector 8, with 2 serving as the modulus. This is followed by step S18, at which the output of the modulator 2 is mixed with the output of the local oscillator 4 in the mixer 3. The output signal of the mixer is outputted from the apparatus as a high-frequency signal through the filter 5.

In the description given above, a case is discussed in which transmission is performed after spread-spectrum modulation. The codes may be generated in the same manner also in a case where a high-frequency signal is received and then subjected to reverse-spreading and demodulation. More specifically, by controlling the selector 8, a plurality of code patterns, namely code patterns for spreading and modulation and code patterns for reverse-spreading and demodulation, are selected and data is spread/reverse spread using the selected codes.

Thus, by reading in data specific to the apparatus when processing starts and performing control in accordance with this data, it is possible for a plurality of apparatus to carry out spreading/reverse-spreading, in which different codes are employed, using a code generator having the same construction.

Second Embodiment

Figure 3:
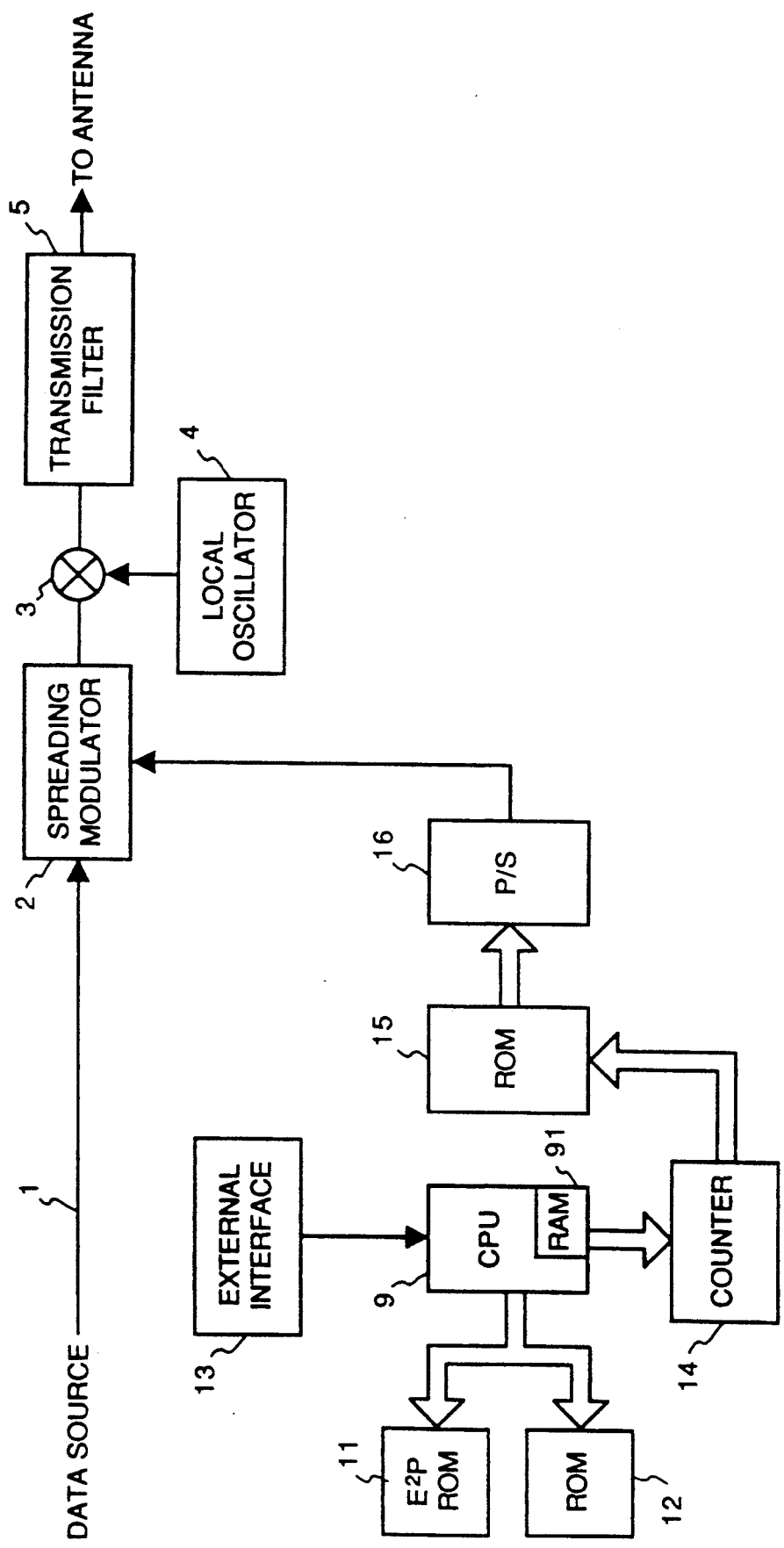
FIG. 3 is a block diagram showing a spread-spectrum communication apparatus according to a second embodiment of the present invention.

FIG. 3 is a block diagram showing a spread-spectrum communication apparatus according to a second embodiment of the present invention. Here the output of a counter 14 is connected to a ROM 15, which stores code patterns, as an address signal of the ROM. Output data from the ROM 15 is inputted to a parallel/serial converting circuit 16. Blocks whose functions are identical with those shown in FIG. 1 are designated by like reference numerals.

Figure 4:
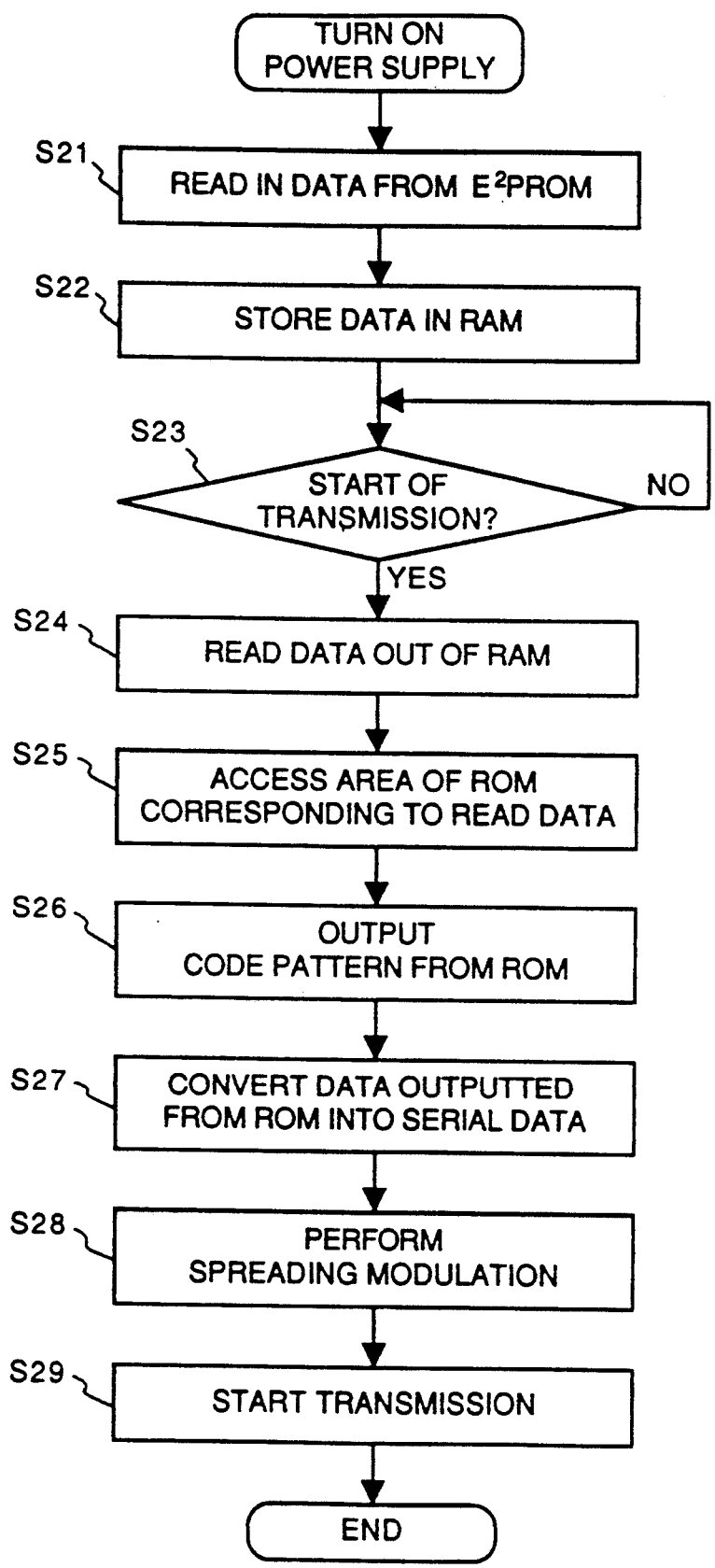
FIG. 4 is a flowchart of the operation performed by the spread-spectrum communication apparatus of the second embodiment.

FIG. 4 is a flowchart of processing executed at the start of communication by the spread-spectrum communication apparatus of this embodiment. The operation of the apparatus will now be described with reference to FIGS. 3 and 4.

When power is introduced to the apparatus, the CPU 9 starts operation in accordance with a program that has been written in the ROM 12. First, at step S21, the E$^2$PROM 11 is accessed and data is read out. Data specific to each apparatus is written in the E$^2$PROM 11 in advance. Next, at step S22, the CPU 9 writes the read data in the internal RAM 91. The RAM 91 may be one connected externally of the CPU 9.

When a communication-start request is received via the external interface 13, a signal indicative of this request enters the CPU 9. The CPU 9 examines this signal at step S23. If the request for starting communication is verified, then the program proceeds to step S24, at which the data specific to each apparatus stored in the RAM is read out. This is followed by step S25 and S26, at which a predetermined address value corresponding to the read data is loaded in the counter 14. The output of the counter 14 enters the ROM 15 as an address signal. The counter 14 performs counting at a period identical with one period of a code pattern and causes the ROM 15 to output a code pattern.

Next, at step S27, parallel data outputted by the ROM 15 is converted into serial code data by the parallel/serial converting circuit 16, and the serial code data enters the spreading modulator 2. At step S28, the modulator 2 adds the data inputted from the data source 1 and the inputted spread-spectrum code, with 2 serving as the modulus. Further, the output of the modulator 2 is mixed with the output of the local oscillator 4 in the mixer 3. The output signal of the mixer is outputted from the apparatus as a high-frequency signal through the filter 5 at step S28. Communication starts at step S29.

In the description given above, a case is discussed in which transmission is performed using spread-spectrum modulation. The codes may be generated in the same manner also in a case where a high-frequency signal is received and then subjected to reverse-spreading and demodulation. More specifically, data specific to the apparatus is read in when the apparatus starts up, and control is carried out in accordance with the results. As a result, it is possible to employ different spreading-/reverse-spreading codes using a code generator having the same construction in a plurality of apparatus.

Third Embodiment

Figure 5:
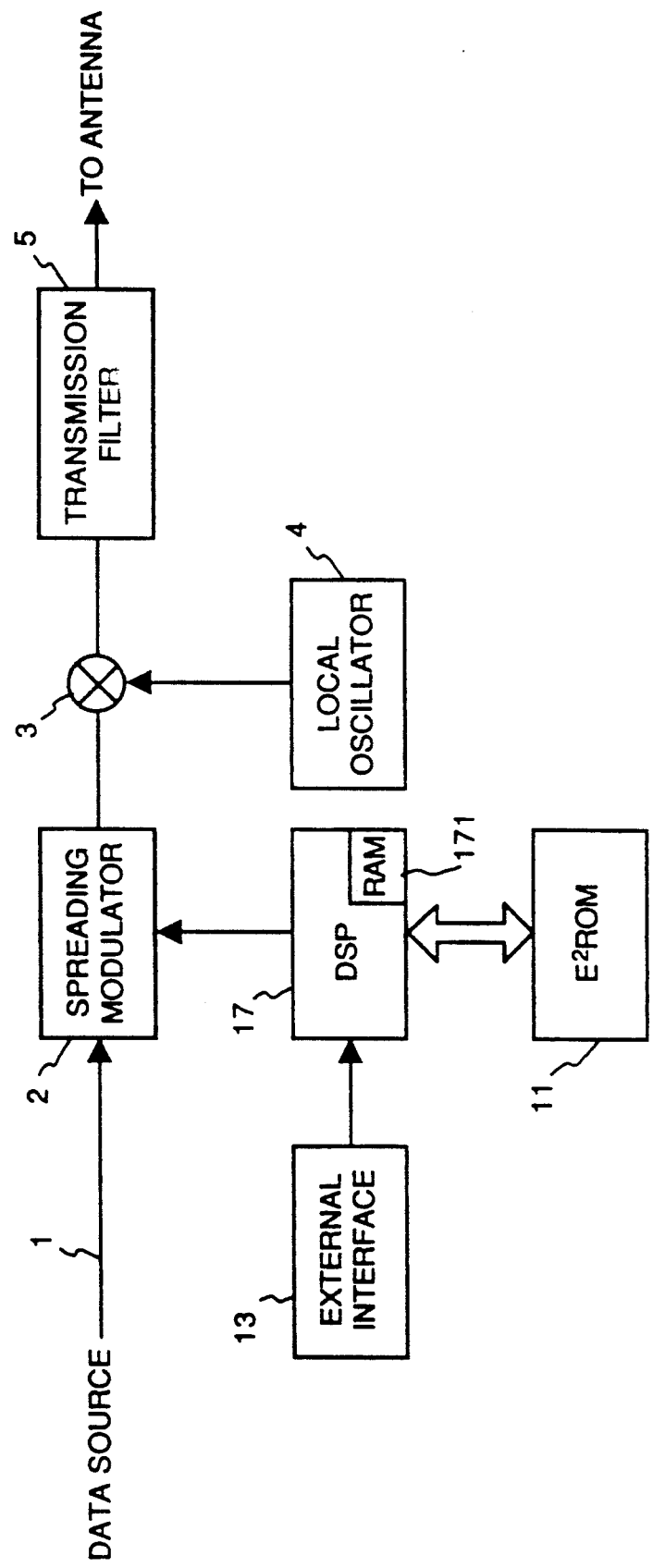
FIG. 5 is a block diagram showing a spread-spectrum communication apparatus according to a third embodiment of the present invention.

FIG. 5 is a block diagram showing a spread-spectrum communication apparatus according to a third embodiment of the present invention. In FIG. 5, a DSP (digital signal processor) 17 consists of a chip having a high-speed hardware multiplier, a ROM, a RAM and an input/output interface, etc. Blocks whose functions are identical with those of the first and second embodiments are designated by like reference numerals.

Figure 6:
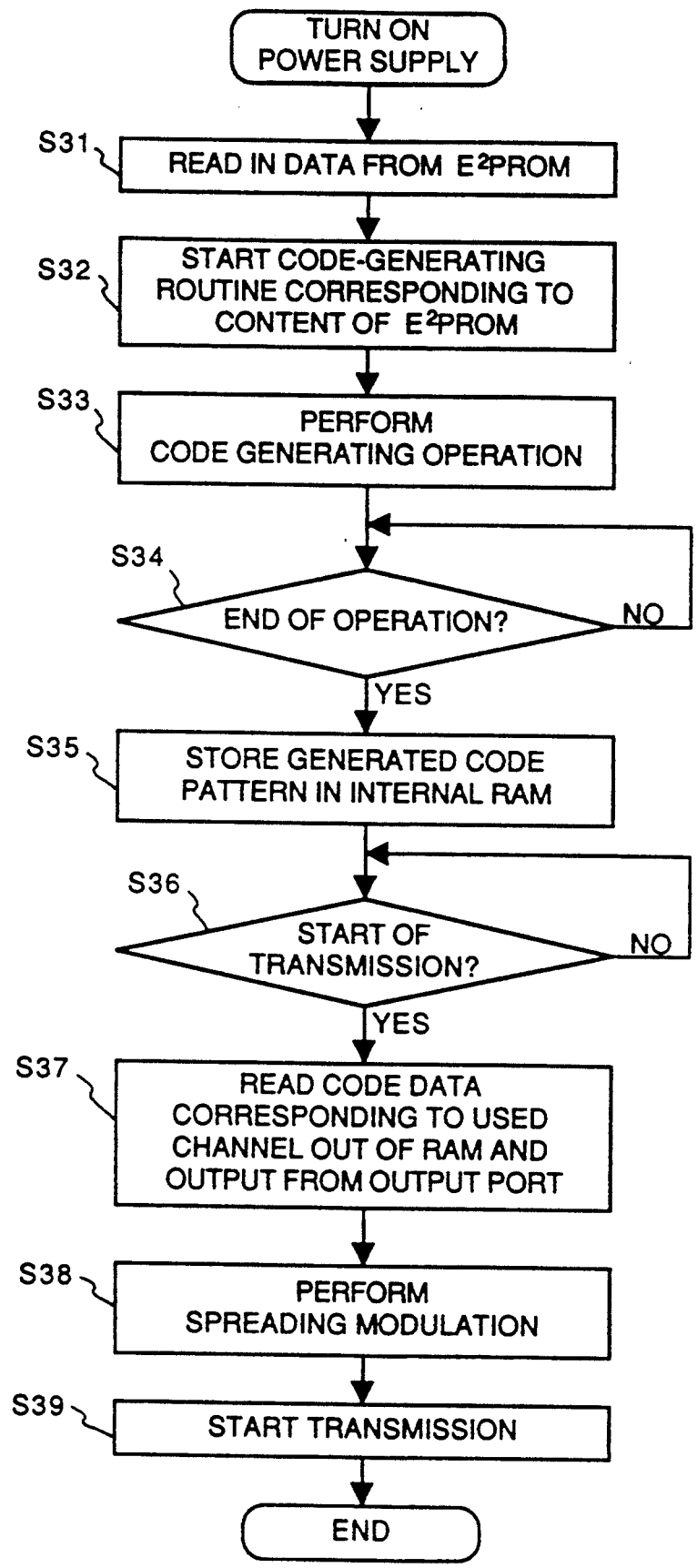
FIG. 6 is a flowchart of the operation performed by the spread-spectrum communication apparatus of the third embodiment.

FIG. 6 is a flowchart of processing executed, at start-up of a power supply, by the spread-spectrum communication apparatus of this embodiment. The operation of the apparatus will now be described with reference to FIGS. 5 and 6.

When power is introduced to the apparatus, operation is started in accordance with a program written in the ROM incorporated in the DSP 17. First, at step S31, the E$^2$PROM 11 is accessed. Data specific to each apparatus is written in the E$^2$PROM 11. Next, at steps S32~S34, the DSP 17 starts processing in accordance with a code-pattern generating routine corresponding to the data read in at step S31. When a code is thus generated, the DSP 17 writes the generated code pattern in an internal RAM 171 at step S35.

When a communication-start request is received via the external interface 13, a signal indicative of this request enters the DSP 17. The DSP 17 examines this signal at step S36. If the request for starting communication is verified, then the program proceeds to step S37, at which the DSP 17 read out the code pattern previously stored in the RAM 171 and outputs the code pattern to the spreading modulator 2 from an output port.

At step S38, the modulator 2 adds the data inputted from the data source 1 and the data inputted from the DSP 17, with 2 serving as the modulus. Finally, at step S39, the spread signal is mixed with the output of the local oscillator 4 in the mixer 3, the output signal of which is outputted from the apparatus as a high-frequency signal through the transmission filter 5.

The foregoing relates to a procedure in a case where spread-spectrum modulation is performed prior to a transmission. The codes may be generated in the same manner also in a case where a high-frequency signal is received and then subjected to reverse-spreading and demodulation. More specifically, data specific to the apparatus is read in when the apparatus starts up, and control is carried out in accordance with the data. As a result, it is possible to employ a code generator having the same construction in a plurality of spread-spectrum communication apparatus.

In the third embodiment described above, the CPU or DSP recognizes the data specific to the apparatus by accessing the $E^2$PROM. However, the same effects can be obtained using a switch rather than storing data in the $E^2$PROM. More specifically, a switch capable of setting a number greater than the number of code patterns desired to be generated is connected to the input port of the CPU or DSP, a value provided by the switch is read by the CPU or DSP, and this value is used instead of a value read in from the $E^2$PROM, thereby making it possible to realize a function similar to that of the embodiment.

Fourth Embodiment

Figure 7:
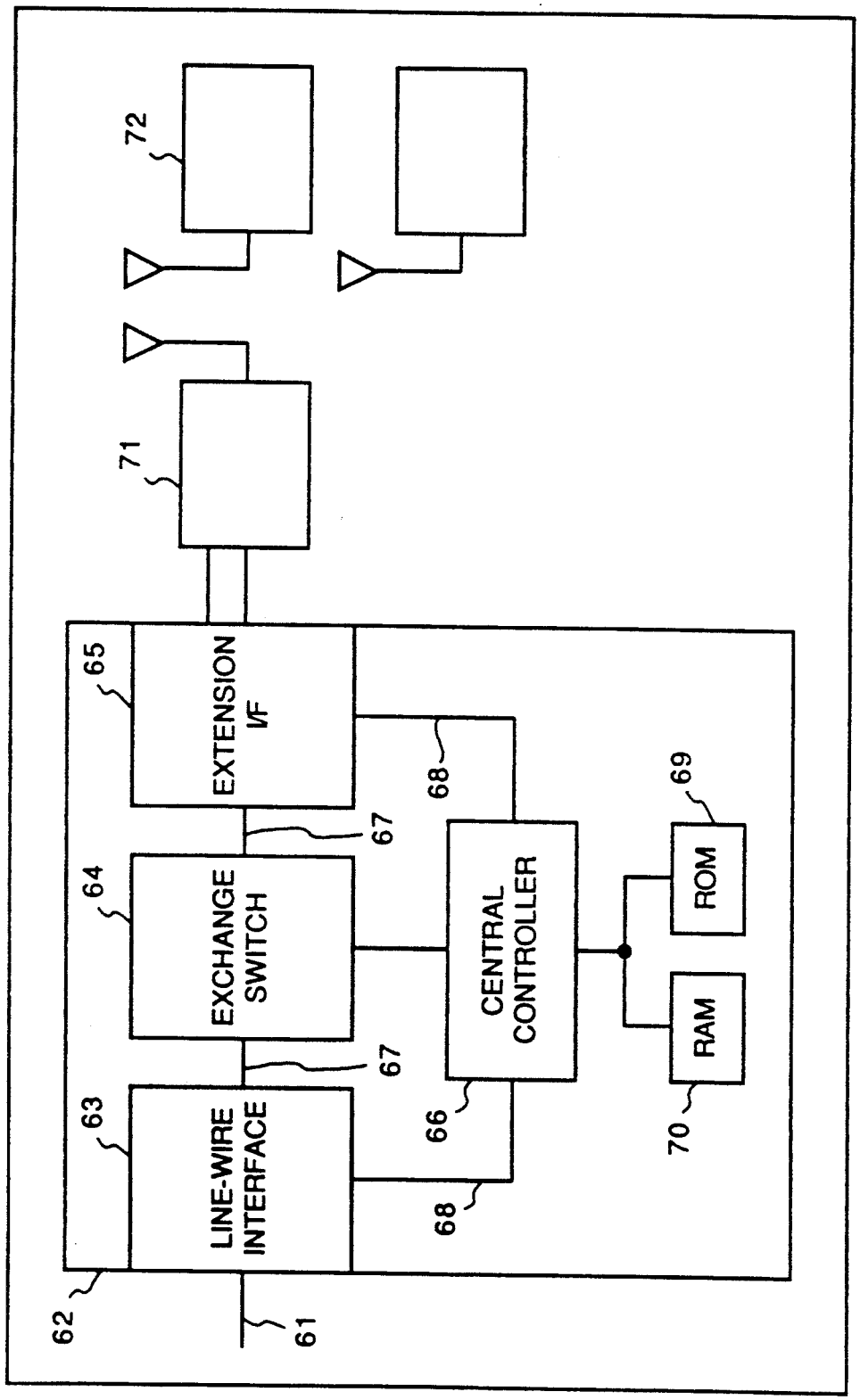
FIG. 7 is a block diagram showing an exchange according to a fourth embodiment of the present invention.

FIG. 7 is a block diagram showing an exchange according to a fourth embodiment of the present invention. As shown in FIG. 7, an exchange control unit 62 connected to a main wire 61 includes a line-wire interface 63, an exchange switch 64, an extension interface 65, a central controller 66, a data highway 67, an interface control bus 68, a ROM 69 and a RAM 70. A terminal interface 71 is connected to the exchange control unit 62. The terminal interface 71 is wirelessly connected to an extension terminal 72.

Figure 8:
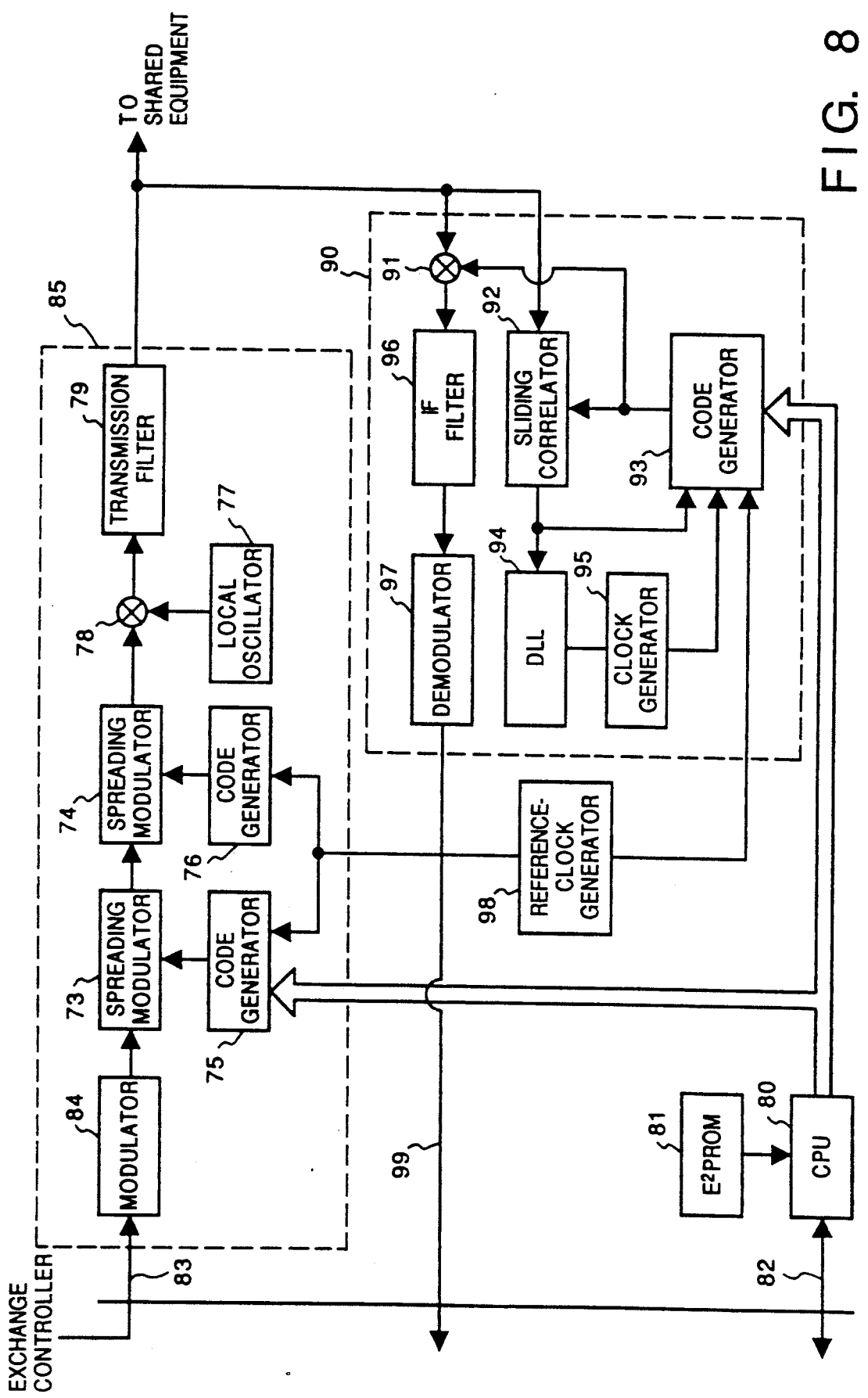
FIG. 8 is a block diagram showing a terminal interface in the exchange according to the fourth embodiment.

FIG. 8 is a block diagram showing the construction of the terminal interface 71. In FIG. 8, the terminal interface 71 receives baseband data 83 from the communication control unit 62. The received baseband data enters a modulating unit 85. The latter includes a modulator 84 for performing PSK modulation, a first spreading modulator 73, a second spreading modulator 74, a first code generator 75, a second code generator 76, a local oscillator 77, a mixer 78 and a transmission filter 79.

A signal from shared equipment enters a demodulating unit 90. The latter includes a reverse-spreading demodulator 91, a sliding correlator 92, a code generator 93, a delayed-lock loop (DLL) 94, a clock generator 95, an IF (intermediate-frequency) filter 96, and a demodulator 97. A demodulated baseband signal 99 is sent to the exchange control unit 62.

A reference clock generator 98 supplies the modulating unit 85 and the demodulating unit 90 with a clock. A CPU 80 is connected to the extension interface 65 by a control line 82 and controls the terminal interface 71. Data used in order to decide the code patterns generated by the code generators 75 and 93 is stored in an $E^2$PROM 81.

Figure 9:
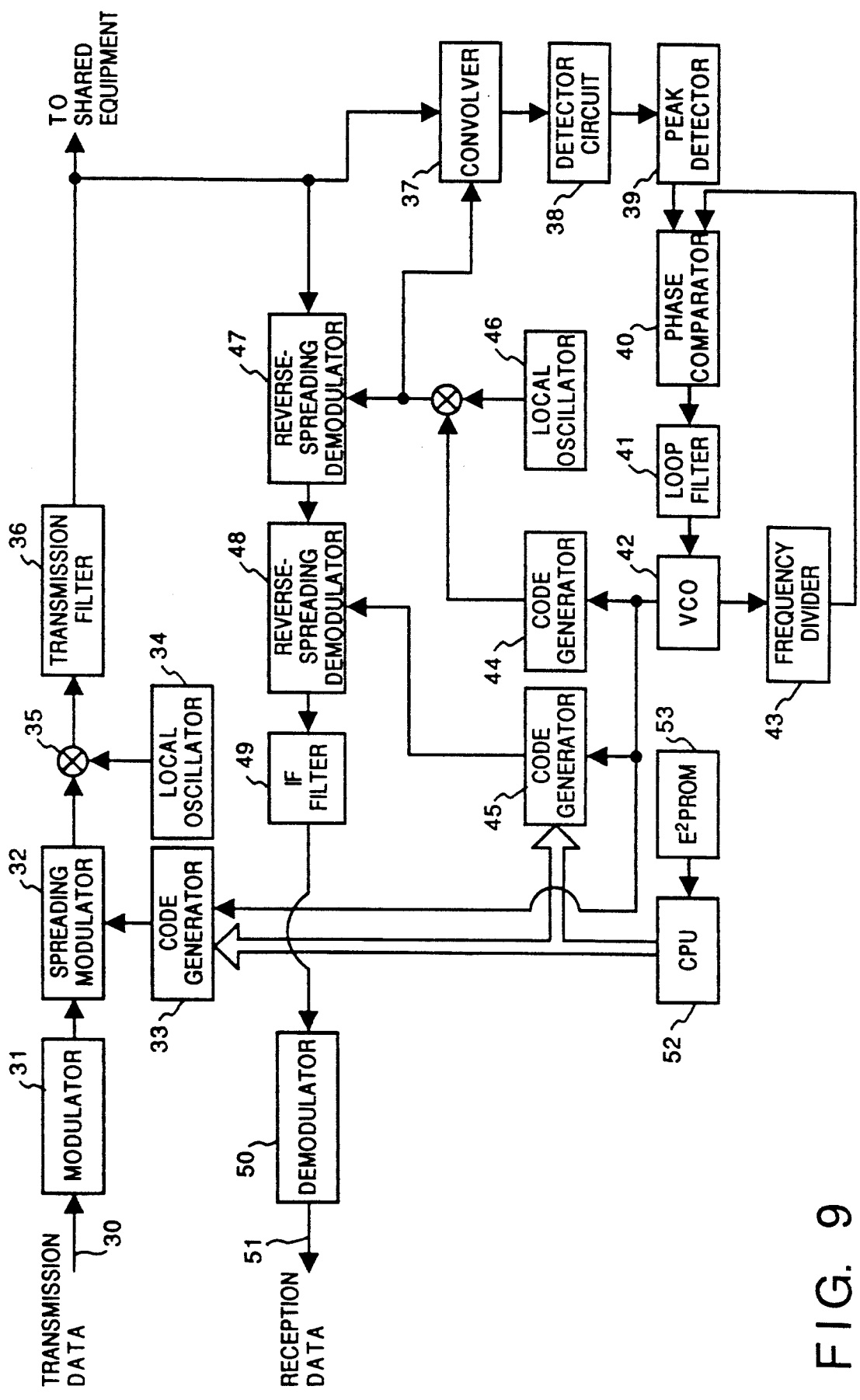
FIG. 9 is a block diagram showing an extension terminal in the exchange according to the fourth embodiment.

FIG. 9 is a block diagram showing the construction of the terminal 72. In FIG. 9, a baseband input signal 30 is modulated by a modulator 31 and the modulated signal is spread by a spreading modulator 32, after which the resulting signal is mixed with a signal, generated by a local oscillator 34, in a mixer 35. The output of the mixer 35 is then outputted upon being limited to transmission frequency band by a transmission filter 36. A code generator 33 generates a spread-spectrum code applied to the spreading modulator 32.

The spread-spectrum code of a received signal and a generated spread-spectrum code are synchronized by circuitry comprising a convolver 37, a detector circuit 38, a peak detector 39, a phase comparator 40, a loop filter 41, a voltage-controlled oscillator (VCO) 42, a frequency divider 43, a first code generator 44 and a local oscillator 46. The received signal is reverse-spread by a first reverse-spreading demodulator 47 and a second reverse-spreading demodulator 48 using a reverse spread-spectrum code generated by the first code generator 44 and a second code generator 45. The reverse-spread signal is band-limited by an IF filter 49, the output of which is demodulated by a demodulator 50 to obtain received baseband data 51. The CPU 52 uses the data in the $E^2$PROM 53 to decide the code patterns generated by the code generators 33, 45.

Figure 10:
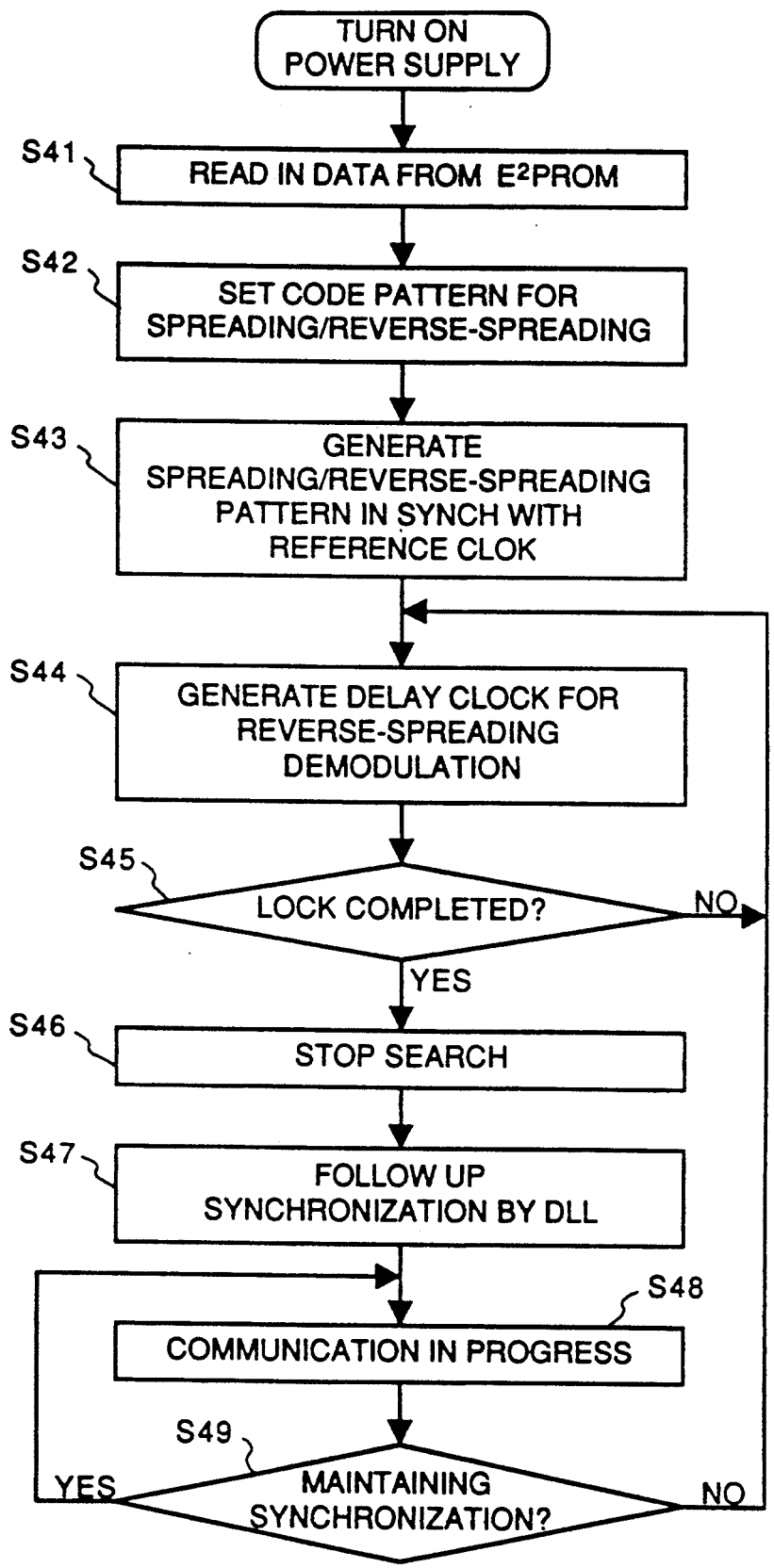
FIG. 10 is a processing flowchart of the terminal interface in the exchange of the fourth embodiment.

FIG. 10 is a processing flowchart implemented when power is introduced to the terminal interface 71. FIG. 11 is a processing flowchart implemented when power is introduced to the terminal 72.

Both flowcharts are for describing a procedure leading to preparations for receiving a signal following start-up. In a case where a signal is transmitted, transmission processing is executed. However, transmission processing is a procedure in conformance with the prior art since spread-spectrum modulation is carried out using a code already decided at the time power is introduced. A communication operation between the terminal interface 71 and the extension terminal 72 will be described in accordance with the FIGS. 7 through 11.

First, when power is introduced to the terminal interface 71, the CPU 80 accesses the $E^2$PROM 81 and reads in data conforming to the terminal that is to perform communication (step S41). If there are a plurality of terminals of other parties, the modulating unit 85 and demodulating unit 90 are provided for each terminal. Accordingly, data specific to the terminal of the communicating party is read in from the $E^2$PROM. Based upon the read data, the CPU 80 sets data (S42) in the code generators 75 and 93 so as to generate a code pattern conforming to the communicating party. This data is decided in conformity with the construction of the code generator. If the code generator has a construction which uses a selector, as in the first embodiment, the data set in the code generator is a selection signal applied to the selector. If the code generator is adapted to read a code out of memory in accordance with an address, as in the second embodiment, then the data set in the code generator is an address. The codes generated by the code generators 75 and 93 may differ. The code generated by the code generator 76 is a code for achieving synchronism with the extension terminal. The code generator 76 generates a fixed pattern common to each terminal (step S43). The code generators 75, 76 and 93 generate code patterns in synchronism with the clock generated by the reference clock generator 98.

In a case where a transmission is made from the terminal interface 71 to the terminal 72, baseband data received from the exchange control unit 62 first enters the modulator 84 in the terminal interface 71, where the data is subjected to modulation such as PSK (phase-shift keying). Thereafter, the modulated signal is fed into the spreading modulator 73. Here the inputted data and the output of the code generator 75 are subjected to addition by the spreading modulator 73 with 2 serving as the modulus. The output of the modulator 73 is applied to the spreading modulator 74, where the signal is spread and modulated using the code generated by the code generator 76. The signal which has thus undergone spreading twice is mixed with the output of the local oscillator 77, after which the resulting signal is transmitted as a high-frequency signal through the transmission filter 79. The spread-spectrum codes generated by the code generators 75, 76 are the codes set at step S42 in FIG. 10.

On the side of the extension terminal 72 also, the CPU 52 accesses the $E^2PROM$ 53 and reads in data specific to each terminal at step S51 after power is introduced. Based upon the data that has been read in, the CPU 52 sets code patterns generated in the code generators 33 and 45 at step S52. A code pattern the same as that of the code generator 93 in the terminal interface 71 is set in the code generator 33, and a code pattern the same as that of the code generator 75 in the terminal interface 71 is set in the code generator 45. Further, the code generator 44 is set beforehand so as to generate a code pattern the same as the code pattern generated by the code generator 76 of the terminal interface 71 (S53).

In the terminal 72, a high-frequency signal received from the terminal interface 71 enters the convolver 37, which is a SAW (surface acoustic wave) convolver. Further, the code generated by the code generator 44 and the signal generated by the local oscillator 46 are mixed and applied to the other input of the convolver 37, where correlation with the received signal is performed. When correlation is detected, the convolver 37 (S54), a peak output is generated and synchronization with the transmitted side is achieved from the timing of the peak output (S55). The synchronized state is maintained by a PLL (phase-locked loop) comprising the phase comparator 40, loop filter 41 and VCO 42.

During the time that synchronization is being maintained, the output of the code generator 44 is mixed with the output of the local oscillator 46, and the result is inputted to the reverse-spreading demodulator 47, the output whereof is inputted to the reverse-spread demodulator 48. The output of the code generator 45 also is applied to the reverse-spreading demodulator 48 (S56). Thus, the received high-frequency signal is demodulated to baseband data (S57, S58).

Meanwhile, the code pattern used in transmission performed by the extension terminal 72 is generated by the code generator 33. The output of the VCO 42 enters the code generator 33. The code generator 33 achieves synchronization with the code pattern, received from the terminal interface 71, by the PLL loop. The data transmitted to the terminal interface 71 enters the spreading modulator 32, where the data is spread and modulated by the output of the code generator 33. The spread signal is mixed with the output of the local oscillator 34, and the result is outputted as a high-frequency signal.

The terminal interface 71 uses a well-known sliding correlator to detect received-signal correlation. The output of the code generator 93 enters the sliding correlator. The code generator 93 generates a code generator identical with the code pattern generated by the code generator 33 of the extension terminal 72. Since the extension terminal 72 operates in synchronism with the terminal interface 71, the frequency of the code pattern generated coincides with the frequency of the code pattern generated by the code generator 33 of the extension terminal 72. However, a phase shift occurs owing to the existence of a transmission delay. Accordingly, the peak of correlation is obtained by varying the phase of the output of the code generator 93, i.e., by inputting a code of a slightly different frequency to the sliding correlator (S44).

When the peak of correlation is obtained and synchronization is completed (S45), a transition is made to synchronization follow-up (S46). Here use is made of a well-known delayed-lock loop (DLL). Synchronization by the sliding correlator is said to require a long period of time. In this embodiment, however, synchronization is obtained between the terminal interface 71 and the extension terminal 72 in advance. Since it will suffice to correct the phase error due to the transmission delay, synchronization is completed (S47, S48) in a practical period of time even by the sliding correlator.

By applying the output of the code generator 93 to the reverse-spreading demodulator 91 while synchronization is thus being maintained, baseband data can be obtained (S49). Applying this data to the controller 46 completes the extension transmission in the exchange apparatus.

Though a case in which there is one terminal per one terminal interface has been described above, operation can be expanded to a case where n-number of terminals are connected to a single terminal interface. If n-number of modulating units 85 and demodulating units 90 in FIG. 8 are provided, communication can be carried out with n-number of extension terminals. In this case, however, it is necessary to control the code generators, which are contained in each modulating unit and each demodulating unit, by the CPU 80. In the terminal interface 71, it is required that the codes generated by the code generators 75 and 93 be changed in correspondence with the extension terminal. The CPU 80 controls the code generators in such a manner that different codes are generated for each terminal. The code generator 76 and sliding correlator 92 used, on the other hand, are common throughout.

Thus, in a case where a plurality of terminals are connected, common synchronizing circuitry can be constructed.

In the above-described description, a case has been discussed in which the extension of the exchange 62 accommodates a plurality of terminals. However, the present invention is capable of providing the same effects without being limited to the exchange apparatus 62. That is, in a case where a communication configuration is considered in which one terminal is capable of communicating with n-number of terminals, this can be realized with exactly the same arrangement and operating procedure if the n-number of terminals are replaced by the extension terminal of FIG. 7 in the terminal interface 71 in FIG. 7.

By thus providing a spread-spectrum communication apparatus with means for reading the content of a non-volatile memory and means for controlling a code generating unit in dependence upon the content read from the memory, as described above, it is possible to use a code generating unit having the same construction in a plurality of apparatus. Since code generators can be used in common, the cost of the code generators is reduced so that it is possible to lower the cost of the apparatus. In addition, it is no longer necessary to manage code generators of a large number of types, and it is possible to develop and manage the apparatus more efficiently.

Further, by providing a spread-spectrum communication apparatus with means for generating a code for reverse-spreading demodulation, means for detecting correlation between the code and a received signal and means for generating a code for spreading and modulation in synchronism with the output timing of the detecting means, the spreading modulation is carried out in synchronism with the period of the code pattern contained in the received signal, and therefore the synchronizing circuit of the other party's apparatus can be constructed with ease. As a result, a reduction in the cost of the synchronizing circuit can be realized.

By performing spread-spectrum modulation for achieving synchronization on the side of an apparatus capable of communicating with a plurality of terminals, it is possible to make common use of the synchronizing circuitry of each terminal. This makes it possible to reduce the cost of the synchronizing circuit.

The present invention is not limited to the above embodiments and various changes and modifications can be made within the spirit and scope of the present invention. Therefore, to apprise the public of the scope of the invention, the following claims are made.

What is claimed is:

1. A spread-spectrum communication apparatus comprising:
   memory means for storing a value specific to the apparatus;
   code generating means, which is capable of generating a plurality of codes, for generating one of the plurality of codes selected by the specific value; and
   spreading means for spreading input data using the code generated by said code generating means.

2. The apparatus according to claim 1, wherein said memory means is a ROM.

3. The apparatus according to claim 1, wherein said memory means is a switch representing the specific value.

4. The apparatus according to claim 1, wherein said code generating means has a ROM and a parallel/serial converter and outputs a code selected by a set address.

5. The apparatus according to claim 1, wherein said code generating means has a code generator for generating the plurality of codes and a selector, wherein a select signal is generated based upon the specific value and a desired code is selected and outputted from the plurality of codes by the select signal.

6. A spread-spectrum communication apparatus comprising:
   receiving means for receiving a signal;
   memory means for storing a value specific to the apparatus;
   code generating means, which is capable of a plurality of codes, for generating one of the plurality of code selected by the specific value; and
   reverse spreading means for reverse-spreading the signal, which has been received by said receiving means, using the code generated by said code generating means.

7. The apparatus according to claim 6, wherein said memory means is a ROM.

8. The apparatus according to claim 6, wherein said memory means is a switch representing the specific value.

9. The apparatus according to claim 6, wherein said code generating means has a ROM and a parallel/serial converter and outputs a code selected by the specific value.

10. The apparatus according to claim 6, wherein said code generating means has a code generator for generating the plurality of codes and a selector, wherein a select signal is generated based upon the specific value and a desired code is selected and outputted from the plurality of codes by the select signal.

11. A spread-spectrum communication apparatus comprising:
    generating means for generating codes of a plurality of types;
    selecting means for selecting a specific code from among the plurality of codes generated by said generating means; and
    spreading means for spreading a communication signal in dependence upon the specific code selected by said selecting means.

12. A spread-spectrum communication apparatus capable of communicating with a plurality of terminals, comprising:
    generating means for generating a first code common to each of the terminals and a second code, wherein the second code is selected from among the plurality of codes in accordance with a terminal of a communication party; and
    spreading means for spreading data, which is transmitted to the terminal of the communication party by the first code and the second code.

13. A spread-spectrum communication apparatus capable of communicating with a plurality of terminals, comprising:
    receiving means for receiving a signal;
    generating means for generating a desired code, in accordance with a terminal of a communication party, from among a plurality of codes; and
    reverse spreading means for reverse spreading the signal, which has been received by said receiving means, by the code generated by said generating means.

14. A spread-spectrum communication apparatus capable of communicating with a plurality of terminals, comprising:
    generating means for generating a first code common to each of the terminals and second and third codes, wherein the second and third codes are selected, from among the plurality of codes in accordance with the terminal of a communication partner;
    spreading means for spreading data, which is transmitted to the terminal of the communication partner, by the first code and the second code;
    receiving means for receiving a signal;

reverse-spreading means for reverse-spreading the signal, which has been received by said receiving means, by the third code.

15. A spread-spectrum communication apparatus comprising:

generating means for generating desired first and second codes in accordance with input data and a fixed code:

spreading means for spreading transmission data by the first code generated by said generating means;

receiving means for receiving a signal;

synchronizing means for synchronizing the fixed code generated by said generating means and the signal received by said receiving means; and reverse-spreading means for reverse-spreading the received signal by the first and second codes generated by said generating means.

16. The apparatus according to claim 15, wherein said synchronizing means synchronizes the first code generated by said generating means and the signal received by said receiving means.

17. A spread-spectrum communication apparatus capable of communicating with a plurality of terminals, comprising:

a terminal interface unit which includes: first generating a means for generating first code common to each of the terminals and desired second and third codes respectively, wherein the second and third codes are selected in accordance with a terminal of a communicating party, from among the plurality of codes, first spreading means for spreading data, which is transmitted to the plurality of terminals, by the first code and the second code, receiving means for receiving a signal, reverse-spreading means for reverse-spreading the signal, which has been received by said receiving means, by the third code; and a terminal unit which includes second generating means for generating fourth, fifth and sixth codes identical with the third, first and second codes respectively in accordance with the input data, second spreading means for spreading transmission data by the fourth code generated by said second generating means, receiving means for receiving a signal, synchronizing means for synchronizing the fifth code generated by said second generating means and the signal received by said receiving means, second reverse-spreading means for reverse-spreading the received signal by the fifth and sixth codes generated by said second generating means.

* * * * *